United States Patent
Understein

(10) Patent No.: US 7,844,537 B2
(45) Date of Patent: Nov. 30, 2010

(54) INTERBANK PROCESS

(75) Inventor: Norman Understein, Potomac, MD (US)

(73) Assignee: eDeposit Corporation, Silver Spring, MD (US)

( * ) Notice: Subject to any disclaimer, the term of this patent is extended or adjusted under 35 U.S.C. 154(b) by 1289 days.

(21) Appl. No.: 10/363,160

(22) PCT Filed: Sep. 6, 2001

(86) PCT No.: PCT/US01/27514

§ 371 (c)(1),
(2), (4) Date: May 29, 2003

(87) PCT Pub. No.: WO02/21384

PCT Pub. Date: Mar. 14, 2002

(65) Prior Publication Data

US 2004/0015436 A1  Jan. 22, 2004

Related U.S. Application Data

(60) Provisional application No. 60/230,418, filed on Sep. 6, 2000.

(51) Int. Cl.
*G06Q 40/00* (2006.01)
(52) U.S. Cl. ............... 705/37; 705/39; 705/26
(58) Field of Classification Search ............ 705/35–44, 705/64–67, 72–79, 26, 37; 902/1–4; 235/379–381
See application file for complete search history.

(56) References Cited

U.S. PATENT DOCUMENTS

| | | | | |
|---|---|---|---|---|
| 5,664,115 A | * | 9/1997 | Fraser | 705/37 |
| 5,677,955 A | * | 10/1997 | Doggett et al. | 705/76 |
| 5,703,344 A | * | 12/1997 | Bezy et al. | 235/379 |
| 5,717,989 A | * | 2/1998 | Tozzoli et al. | 705/37 |
| 5,794,207 A | * | 8/1998 | Walker et al. | 705/77 |
| 5,890,138 A | * | 3/1999 | Godin et al. | 705/26 |
| 5,924,083 A | * | 7/1999 | Silverman et al. | 705/37 |
| 5,999,915 A | * | 12/1999 | Nahan et al. | 705/27 |
| 6,023,686 A | * | 2/2000 | Brown | 705/37 |
| 6,029,150 A | * | 2/2000 | Kravitz | 705/39 |
| 6,202,051 B1 | * | 3/2001 | Woolston | 705/27 |
| 6,260,024 B1 | * | 7/2001 | Shkedy | 705/37 |
| 7,249,055 B1 | * | 7/2007 | Elder | 705/26 |
| 2001/0039529 A1 | * | 11/2001 | Hoffman | 705/37 |
| 2001/0047308 A1 | * | 11/2001 | Kaminsky et al. | 705/26 |

OTHER PUBLICATIONS

Davidson, Hilary. Chatelaine; "Auction action". Toronto: Sep. 2000. vol. 73,Iss. 9; pg. Insert.*
Lin Connery, For the Calgary Herald; "Ready, set, bid!; [Final Edition]". Calgary, Atla.: Aug. 18, 2000. pg. L. 1. FRO.*
PR Newswire; "i-Escrow Parteners with Sumitomo, Trans Cosmos to Provide Payment Settlement Services for Web Auctions in Japan". New york: Aug. 14, 2000. p. 1.*

* cited by examiner

*Primary Examiner*—Hani Kazimi
(74) *Attorney, Agent, or Firm*—Nixon & Vanderhye P.C.

(57) ABSTRACT

In transactions between a consumer and a merchant where a merchant requires a deposit for participation, a method and system are provided for intermediating the transaction (10). The system enables a consumer to secure the required deposit amount for the transaction with funds deposited in one of a bank account (14) or a special deposit account (16). Fees are generated based on a percentage of the deposit amount secured with the deposited funds and/or by providing an interest rate on funds deposited in the special deposit account (16) with a fixed spread from a bank interest rate. The system assures merchants that deposit funds have been reserved for a particular transaction, and enables consumers to participate in such transactions without requiring an actual transfer of funds.

8 Claims, 1 Drawing Sheet

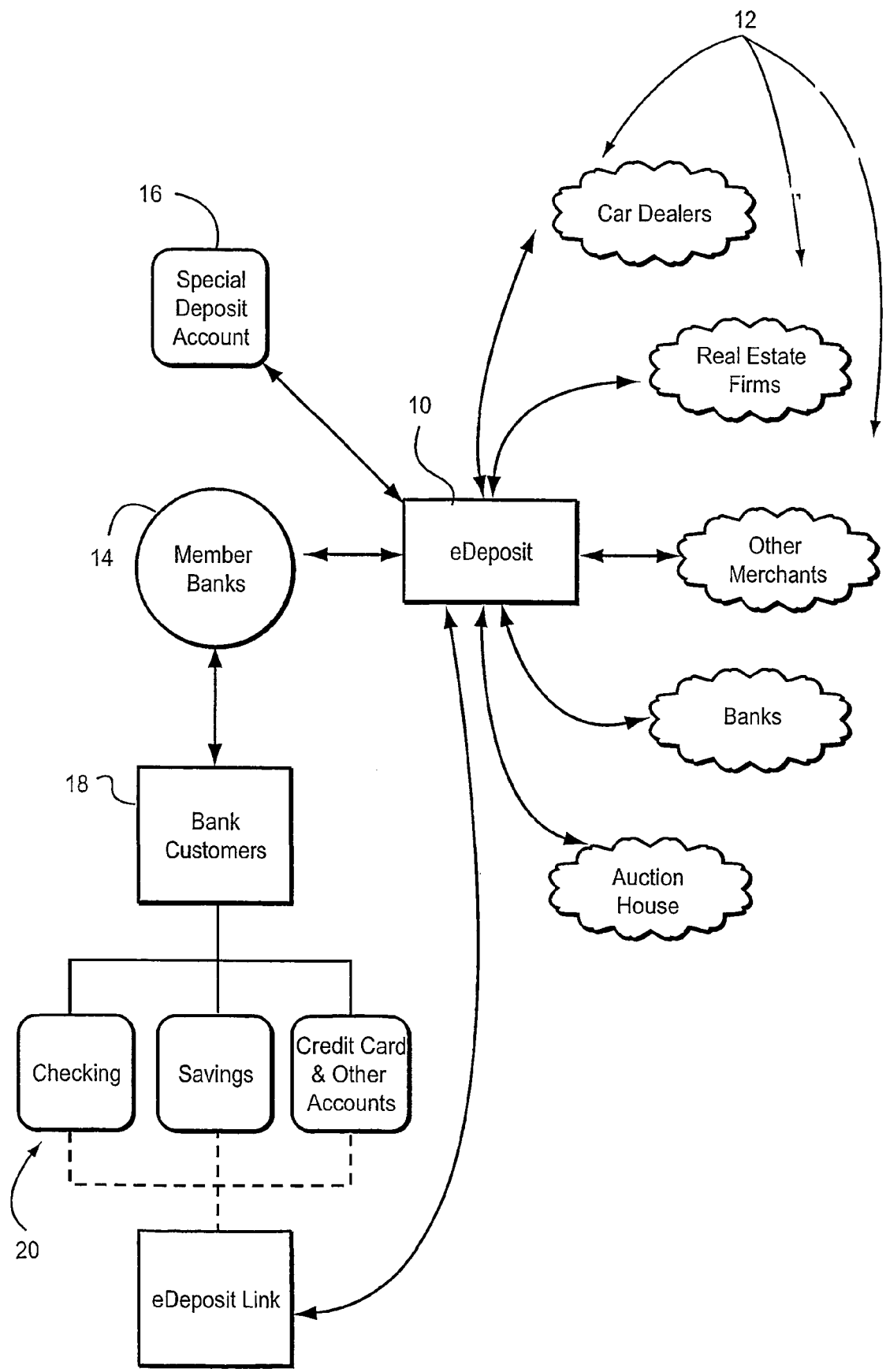

INTERBANK PROCESS

CROSS-REFERENCES TO RELATED APPLICATIONS

This application claims the benefit of U.S. Provisional Patent Application Ser. No. 60/230,418, filed Sep. 6, 2000, the entire content of which is herein incorporated by reference.

STATEMENT REGARDING FEDERALLY SPONSORED RESEARCH OR DEVELOPMENT (NOT APPLICABLE)

BACKGROUND OF THE INVENTION

The present invention relates to methods and systems for intermediating a transaction between a consumer and a merchant and, more particularly, to such methods and systems wherein consumers can satisfy deposit requirements for a transaction via a direct link with an existing bank account or a special deposit account.

Several types of transactions typically require consumers to provide a deposit before enabling them to participate in the transaction. Examples of transactions that often require deposits include auctions, automobile sales, real estate sales, and the like. If a large deposit is required, e.g., for a transaction involving a high cost product such as real estate, in order to secure the deposit, consumers may be required to access savings accounts, brokerage accounts or the like to obtain a bank check for participating in the transaction. Ultimately, if the transaction is not completed, the consumer must then return the funds to their account or otherwise process their funds. This procedure results in a significant burden for the consumer.

BRIEF SUMMARY OF THE INVENTION

It would thus be desirable to provide consumers with a means of securing a transaction deposit requirement without requiring the consumer to actually provide the funds to the merchant. From a merchant's standpoint, it would be desirable for the merchant to be assured that the deposit funds were available without requiring the merchant to process the deposit funds unless necessary. The method and system according to the present invention provides security to a seller of goods to know that the payment is available and will be made when the goods are delivered, and security to the buyer of goods to know that the goods being purchased are actually delivered before the payment is made.

The method and system according to the present invention effects an intermediary in a transaction between a consumer and a merchant involving an exchange of monetary funds. The intermediary provides access via a link to an existing bank account or via a special deposit account for consumers to secure deposits required in a transaction.

In an exemplary embodiment of the invention, a method of intermediating a transaction between a consumer and a merchant involving an exchange of monetary funds includes the steps of (a) receiving subscriptions from merchants and registering the merchants as member merchants; (b) providing a vehicle for the member merchants to require a deposit amount for the transaction; and (c) enabling a consumer to secure the deposit amount for the transaction with funds deposited in one of a bank account or a special deposit account. The method may further include the step of generating fees based on a percentage of the deposit amount secured with the deposited funds. Alternatively or additionally, fees may be generated by providing an interest rate on funds deposited in the special deposit account with a fixed spread from a bank interest rate.

In one embodiment, the method further includes the step of receiving subscriptions from banks and registering the banks as member banks, wherein step (c) is practiced by linking the consumer's bank account and reserving an amount of funds in the consumer's bank account corresponding to the deposit amount. In this context, the consumer's bank account is at least one of a checking account, savings account, credit card, or letter of credit.

Step (c) may be practiced by placing a hold on the deposited funds in an amount corresponding to the deposit amount, wherein the deposited funds placed on hold are made unavailable to the consumer. Upon completion of the transaction, the hold on the deposited funds may be released, or the deposited funds placed on hold may be transferred according to preset consumer preferences.

Step (c) may also be practiced by providing an online link to a transaction intermediary through the consumer's existing bank account.

In another exemplary embodiment of the invention, a method of reserving funds in a transaction requiring a deposit between a consumer and a merchant is provided. The method includes holding consumer funds in one of an existing bank account or a special deposit account in an amount corresponding to a required deposit. Service fees are generated: (1) on a transaction basis in accordance with either an amount of funds deposited in the special deposit account or an average amount of funds held over a set period of time, or (2) based on a fixed spread between an interest rate offered by associated banks and an interest rate provided to the consumer.

In yet another exemplary embodiment of the invention, systems for practicing the methods of the invention are provided.

BRIEF DESCRIPTION OF THE DRAWING

These and other aspects and advantages of the present invention will be described in detail with reference to the accompanying drawing, showing a schematic block diagram of the method and system according to the present invention.

DETAILED DESCRIPTION OF PREFERRED EMBODIMENTS

The present invention is an extension of commonly-owned co-pending U.S. patent application Ser. No. 09/567,589, filed May 10, 2000, and commonly-owned co-pending U.S. patent application Ser. No. 09/617,065, filed Jul. 13, 2000, the entire contents of which are hereby incorporated by reference. The features according to the present invention may be implemented as a supplement to the methods and systems discussed in the noted co-pending applications or alternatively may be used independently. Although the noted co-pending applications are directed to e-commerce transactions and the methods and systems according to the present invention are well suited for e-commerce transactions, the invention is not necessarily meant to be limited, but could have broad applications in offline consumer transactions.

Additionally, in the context of the present invention, a "merchant" can be any company or individual that offers a product or service for sale or acts as an intermediary for a transaction. "Banks" encompass those banks, other financial institutions, and other depositories of funds, both national and international who either hold customer funds, issue credit, or provide other conventional banking services to customers. Reference to a "bank account" in the context of the present invention may encompass any type of account including checking, savings, certificates of deposits, credit cards, letters of credit, and the like.

Referring to the FIGURE, the eDeposit™ system 10 acts as an intermediary between member merchants 12 and consumers via member banks 14 or special system-supported deposit accounts 16. The system 10 receives subscriptions from merchants for registration as member merchants. The member merchants 12 may be required to pay a fee for registration. Member banks 14 may offer the intermediary system 10 according to the invention as a service to its customers 18. Similar to merchants, the system 10 receives subscriptions from interested banks for registration as member banks. Bank customers 18 of the member banks 14 are provided with the ability to open a new account to be used for these transactions or link one or more of their current accounts 20 for system functionality. The special deposit account 16 is an account similar to a regular bank savings account that is set up through the eDeposit™ system 10. The special deposit account 16 is described in more detail in the above-noted co-pending applications.

If a merchant 12 such as a car dealer, real estate firm, etc. requires a deposit for a consumer to participate in a transaction (such as placing a bid on the purchase of real estate), instead of the consumer supplying actual deposit funds in the form of a check, money order or the like, the consumer rather uses the system 10 to allow the merchant 12 to reserve or place a "hold" on a deposit amount in the consumer's account 16, 20, which as discussed above can be linked to a current checking, savings or credit card account or a separate bank account used exclusively for deposit transactions. The "hold" status provides the needed assurance to the merchant 12 of the consumer's bona fide interest in completing a transaction, without requiring the consumer to transfer funds to the respective merchant 12. From the consumer's perspective, the system 10 enables transactions to proceed without risk of default and subsequent loss of transferred deposit funds.

When a "hold" is placed on funds in a consumer's account, the funds are unavailable to the consumer for other purposes. Upon completion of the transaction, the "hold" can be released by the system 10 or the funds transferred according to preset consumer preferences.

The system 10 may itself be associated with one or more banks to offer complementary banking services with associated deposit accounts. In this context, users can register directly with the system 10 and set up the special deposit account 16 that is maintained by the system 10 through an associated bank. Fees for services can be generated, for example, by offering an interest rate to system customers with a fixed spread from the interest rate offered by the associated banks to the system 10. Alternatively, member banks 14 can offer a link to the system to existing bank customers 18 through existing accounts 20 or special accounts established exclusively for deposit transactions. The system according to the present invention can thus be an attractive additional feature that banks can offer to its customers.

System fees can be generated via bank service fees for use of the system based on, for example, an amount deposited in the special deposit account 16 or dedicated bank account or based on an average amount of funds held or reserved on a monthly or other time period basis or the like.

With the system and methods of the present invention, both consumers and merchants are provided with a vehicle to facilitate participation in transactions requiring a deposit. For consumers, the system conveniently relieves the burden of having to process funds for every transaction, and for merchants, they can be assured that deposit funds are available without requiring physical processing of the funds unless necessary.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of intermediating a transaction between a consumer and a merchant involving an exchange of monetary funds, the method comprising:
   (a) receiving subscriptions from merchants and registering the merchants as member merchants;
   (b) providing a vehicle for the member merchants to require a deposit amount for the transaction; and
   (c) enabling a consumer to secure the deposit amount for the transaction with funds deposited in one of a bank account or a special deposit account without requiring the consumer to provide the funds to the merchant or to another account,
   wherein step (c) is practiced by placing a hold on the deposited funds in an amount corresponding to the deposit amount, wherein the deposited funds placed on hold are unavailable to the consumer, and wherein upon completion of the transaction, the hold on the deposited funds is released, and the released funds are again available to the consumer.

2. A method according to claim 1, further comprising the step of generating fees based on a percentage of the deposit amount secured with the deposited funds.

3. A method according to claim 1, further comprising the step of generating fees by providing an interest rate on funds deposited in the special deposit account with a fixed spread from a bank interest rate.

4. A method according to claim 1, further comprising the step of receiving subscriptions from banks and registering the banks as member banks, wherein step (c) is practiced by linking the consumer's bank account and reserving an amount of funds in the consumer's bank account corresponding to the deposit amount.

5. A method according to claim 4, wherein the consumer's bank account comprises at least one of a checking account, savings account, credit card, or letter of credit.

6. A method according to claim 1, wherein upon completion of the transaction, the deposited funds placed on hold are transferred according to preset consumer preferences.

7. A method according to claim 1, wherein step (c) is practiced by providing an online link to a transaction intermediary through the consumer's existing bank account.

8. A system for intermediating a transaction between a consumer and a merchant involving an exchange of monetary funds, the system comprising:
   means for receiving subscriptions from merchants and registering the merchants as member merchants;
   means for providing a vehicle for the member merchants to require a deposit amount for the transaction; and
   means for enabling a consumer to secure the deposit amount for the transaction with funds deposited in one of a bank account or a special deposit account without requiring the consumer to provide the funds to the merchant or to another account, wherein the means for enabling the consumer to secure the deposit amount comprises means for placing a hold on the deposited funds in an amount corresponding to the deposit amount, wherein the deposited funds placed on hold are unavailable to the consumer, and wherein upon completion of the transaction, the hold on the deposited funds is released, and the released funds are again available to the consumer.

* * * * *